United States Patent
Schröder

(10) Patent No.: US 12,521,902 B2
(45) Date of Patent: Jan. 13, 2026

(54) JOINING/PARTING UNIT FOR FILM WEBS

(71) Applicant: WINDMÖLLER & HÖLSCHER KG, Lengerich (DE)

(72) Inventor: Christian Schröder, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 257 days.

(21) Appl. No.: 17/768,330

(22) PCT Filed: Oct. 14, 2020

(86) PCT No.: PCT/EP2020/078823
§ 371 (c)(1),
(2) Date: Apr. 12, 2022

(87) PCT Pub. No.: WO2021/074177
PCT Pub. Date: Apr. 22, 2021

(65) Prior Publication Data
US 2024/0165839 A1    May 23, 2024

(30) Foreign Application Priority Data
Oct. 15, 2019 (DE) .................. 10 2019 215 837.4

(51) Int. Cl.
*B26D 3/00* (2006.01)
*B29C 48/00* (2019.01)
*B29C 48/10* (2019.01)
*B29C 55/28* (2006.01)

(52) U.S. Cl.
CPC .......... *B26D 3/001* (2013.01); *B29C 48/0018* (2019.02); *B29C 48/0022* (2019.02); *B29C 48/10* (2019.02); *B29C 55/28* (2013.01); *B29C 2793/0036* (2013.01)

(58) Field of Classification Search
CPC ..................................................... B26D 3/001
USPC ............................................................ 83/880
See application file for complete search history.

(56) References Cited

U.S. PATENT DOCUMENTS

| 2,757,495 | A |   | 8/1956  | Reichel |                         |
|-----------|---|---|---------|---------|-------------------------|
| 3,068,730 | A |   | 12/1962 | Johnson |                         |
| 3,789,713 | A | * | 2/1974  | Peters  | B26D 3/001<br>83/436.15 |

(Continued)

FOREIGN PATENT DOCUMENTS

| DE | 2128534  | 2/1973 |
| DE | 10243958 | 4/2004 |

*Primary Examiner* — Nhat Chieu Q Do
(74) *Attorney, Agent, or Firm* — Dunlap Bennett & Ludwig PLLC

(57) ABSTRACT

An apparatus is configured to separate a two-ply film web having a first ply and a second ply, the plies being joined via two side edges. The apparatus has two lengthwise slitting units that make a lengthwise slit into the first ply, with the slits being at a distance from the side edges. A pressing element moves in a direction orthogonal to that of a plane defined by the film web so as to space apart from one another the two plies. The pressing element is in contact only with a region of the film web that lies between one of the two side edges and an adjacent lengthwise slit, and is movable in the plane of the film web, and perpendicular to a longitudinal direction thereof, so that the pressing element is guided between the slit two plies to effect the separation of the film web.

9 Claims, 6 Drawing Sheets

(56) References Cited

U.S. PATENT DOCUMENTS 6,521,153 B1 * 2/2003 Scalia ................... B28B 5/028
　　　　　　　　　　　　　　　　　　　83/881
7,137,539 B2 * 11/2006 Jackson ................ B65H 35/02
　　　　　　　　　　　　　　　　　　　225/2

* cited by examiner

JOINING/PARTING UNIT FOR FILM WEBS

BACKGROUND OF THE INVENTION

1. Field of the Invention

The invention relates to an apparatus and a method for parting a two-ply film web into two single-ply film webs and for starting the winding of one of the single-ply film webs.

2. Description of Related Art

Blown film lines, with which a two-ply film web can be produced, have been in use for many years. Such a blown film line often includes a nozzle head with a nozzle gap that is in particular circular. A plastic melt is forced out or extruded from this nozzle head, so that a film tube is created. One of the downstream devices in the transport direction of the film tube is a flattening device and/or squeezing device, with which the film tube can be flattened so that the two-ply film web is created from the circular film tube, whereby the two plies are joined to one another along their longitudinal edges.

It is often desirable to separate the two-ply film web and feed it as one respective ply to a respective winding point within a winding station or within two winders and wind it up there. At the start of production, i.e., during the start-up process, the two-ply film web has to be separated manually onto two winding points. The flattened film tube is first fed to a single, first winding point and wound up there. As soon as the desired film quality and width has been achieved, the flattened tube is separated into two single-ply film webs, so-called flat webs, by side slitting knives. The operator then has to manually separate the two flat webs that are still lying on top of one another by trying to lift one flat web away from the other and placing his hand between the two webs. As soon as the operator has succeeded in doing this, he cuts the web with a knife (cutter knife or the like) and thus separates the webs. Next, he manually knots the start of the flat web, created in this manner, with the film which has been pulled into the second winding point or, alternatively, with a starting belt. After said knotting has been completed, the operator has to start the second winding point. In the time after parting the web and knotting, the production of the blown film line takes place at a reduced web speed to ensure that the manual parting and knotting and any resulting slack (excess material web) does not become too large. Too much slack can lead to tangling/knotting of the film web, which in turn can be dangerous for the operator because of the risk of entanglement. Knotting also entails the risk of the operator's limbs (fingers/hand) accidentally being knotted and pulled in if the start-up of the winding point is released too soon.

Only after the second winding point has been provided with the film web can the blown film line be brought up to the desired web speed, allowing production conditions to be created.

In the event of a flat web loss at a winding point, the production speed has first to be reduced so that manual parting and knotting can be carried out again.

Overall, the process is not only time-consuming, but also involves the described risk of accidents for the operator as a result of handling a knife.

SUMMARY OF THE INVENTION

The object of the present invention is therefore to propose an apparatus and a method with which the risk of accidents for the operator is reduced.

The object is achieved by the features of the various embodiments of the invention as described herein.

Therefore, an apparatus for separating a two-ply film web is provided, which film web can first be wound up at a winding point, wherein the two plies of the film web are first joined to one another via two side edges, wherein the apparatus comprises the following features:

two lengthwise slitting units, with which lengthwise slits are provided in a first of the two plies of the two-ply film web, which are at a distance from side edges, so that the one ply is narrower than the two-ply film web, at least one pressing element, which can be moved in orthogonal direction of the plane defined by the two-ply film web, wherein the two plies of the two-ply film web can be spaced apart from one another, and which can be moved in the plane of the two-ply film web, but perpendicular to its longitudinal direction, so that the pressing element can be guided between the two plies of the two-ply film web.

This invention offers the advantage that the two lengthwise slits in particular first result in a narrow first ply and the second ply extends around the side edges, so to speak. The second ply can now be pushed back with the pressing element and separated from the first ply. The separation preferably extends so far that the pressing element can now also be moved in the plane of the film web, but perpendicular to its longitudinal direction, so that the pressing element, which is advantageously designed as a roll or roller, can be moved between the two plies. The two plies can consequently not fall back together. The operator can therefore now make a lengthwise slit with a knife without first having to separate the webs manually, which already reduces the risk of accidents.

However, it is advantageous that a parting device is provided, with which the first ply of the two-ply film web can be separated, so that a new start of the web is created. In this case, it is no longer necessary for the operator to use a knife to cut through the first ply. This further reduces the risk of accidents. All that remains then for the operator is to connect the new start of the web to the lead-in tape.

In another advantageous embodiment of the invention, a holding device is provided, with which a lead-in tape can be held and brought close to the first ply. The operator can thus also be relieved of this task, because it must be borne in mind that a moving web always poses a risk of accident and injury. The operator only has to ensure that the lead-in tape is inserted into the holding device. This can be done before the blown film line as a whole is started and/or at a distance from the moving web, which does not pose a risk to the health of the operator. A lead-in tape is understood to be any means capable of pulling the start of the web connected to it into the winder, i.e., in particular a film (for example from a previous job) or the starting belt described above.

In another advantageous embodiment, a joining device is provided with which the new start of the web and the lead-in tape can be joined to one another. The operator is thus also relieved of the task of having to knot the lead-in tape and the start of the web together, so that he no longer has to work manually to wind the first ply onto a further winding point. The joining device can be equipped with a stamper, for example, with which the start of the web can be pressed against the lead-in tape, which is preferably provided with a double-sided adhesive tape.

It is then only necessary to wind the new start of the web onto a winder in the winding point.

The apparatus according to the invention is preferably a component of a blown film line described above. The apparatus preferably comprises the lengthwise slitting unit. Said slitting unit can be disposed in the region of the flattening device and can in particular be movably attached to it, so that a lengthwise slit can be made even before the film tube has ultimately been converted into a two-ply film web. It can then be avoided that the second ply of the two-ply film web is also unintentionally provided with slits. It is also possible to provide a second lengthwise slitting unit in the flattening device.

It is also conceivable, however, to use a first lengthwise slit to bring further lengthwise slitting units disposed in the transport path of the two-ply film web into engagement with the film web. For this purpose, further pressing elements can be provided, with which a distance between the first and the second ply of the two-ply film web can likewise be created and which can be used to introduce lengthwise slitting units, in particular in the form of side edge slitting knives.

The above-described object is additionally achieved by a method for separating a two-ply film web which is first wound up at a winding point, wherein the two plies of the film web are first joined to one another via two side edges, wherein the method comprises the following features:
  introducing two lengthwise slits into a first of the two plies of the two-ply film web with two lengthwise slitting units, wherein the lengthwise slits are at a distance from side edges, so that the one ply is narrower than the two-ply film web,
  separating the two plies of the two-ply film web from one another with at least one pressing element, which is moved in orthogonal direction of the plane defined by the two-ply film web,
  guiding the pressing element between the two plies of the two-ply film web, wherein the pressing element is moved in the plane of the two-ply film web but perpendicular to the longitudinal direction thereof.

This achieves the same advantages that have already been achieved in the context of an apparatus according to the invention.

BRIEF DESCRIPTION OF THE DRAWINGS

Further advantages, features and details of the invention will be apparent from the following description, in which different design examples are explained in detail with reference to the figures. The features mentioned in the claims and in the description can always be essential to the invention individually or in any combination of mentioned features. Within the scope of the entire disclosure, features and details described in the context of the method according to the invention naturally always also apply in the context of the apparatus according to the invention and vice versa, so that mutual reference is or can always be made with respect to the disclosure of the individual aspects of the invention. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
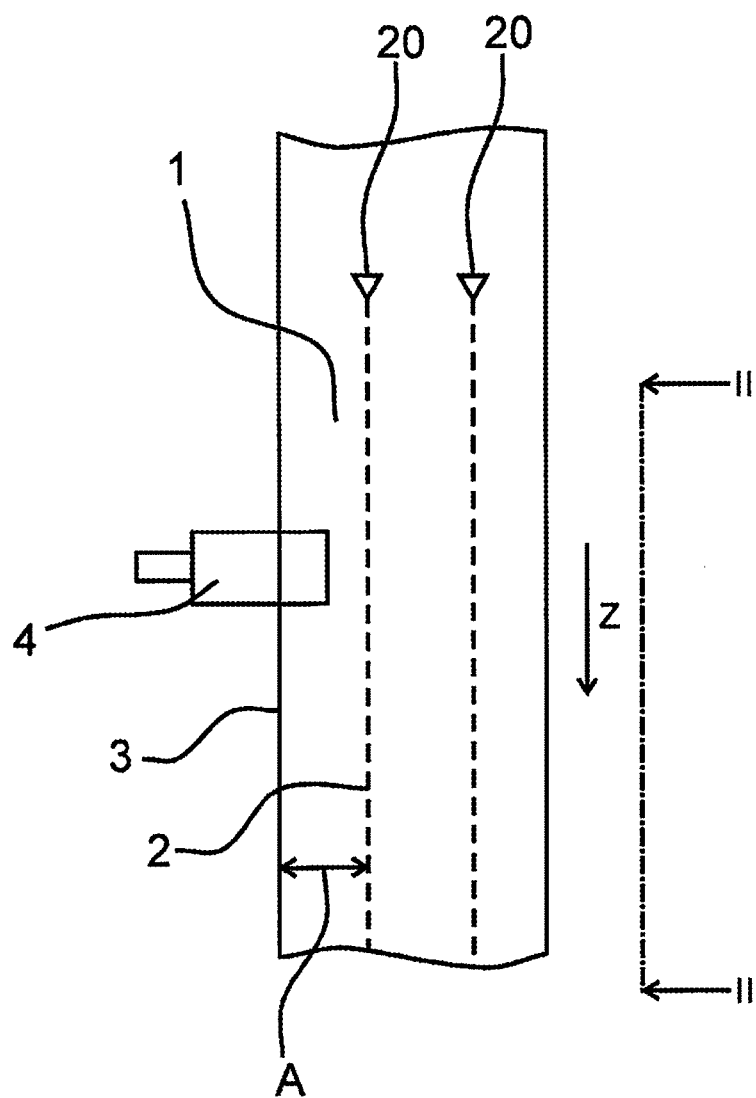
FIG. 1 a two-ply film web with two lengthwise slits
  FIG. 2 the two-ply film web with pressing element
  FIG. 3 the two-ply film web prior to a displacement of the pressing element
  FIG. 4 the two-ply film web with the pressing element located between the plies.

FIG. 1 shows a two-ply film web 1 with two lengthwise slits 2, which are indicated with dashed lines produced by at least one and preferably two lengthwise slitting units 20. The film web moves in transport direction z. It can be seen that the lengthwise slits 2 are spaced apart from the side edge 3 at a distance A. The distance A to the nearest side edge 3 can also be different for each lengthwise slit, which does not limit the functionality of the invention. A pressing element 4 is shown as well. It is in particular possible that two pressing elements spaced apart in transport direction z are provided. A pressing element 4 can be configured as a roller, so that it rolls on the film web 1 while it is in contact with it.

Figure 2:
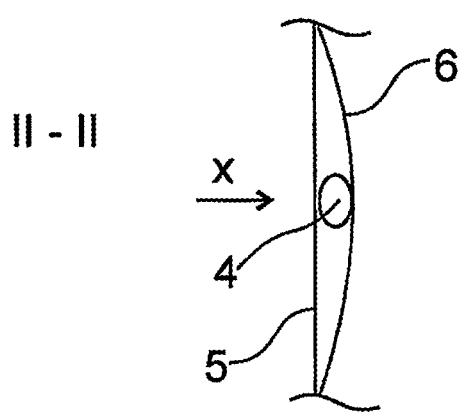

FIG. 2 now shows that the pressing element has been moved in direction x (orthogonal to the plane defined by the film), whereby the pressing element is only in contact with a region of the film web 1 that lies between the side edge 3 and the next adjacent lengthwise slit 2. This makes it possible to separate the first ply 5 of the film web 1 and the second ply 6 of the film web in direction x.

Figure 3:
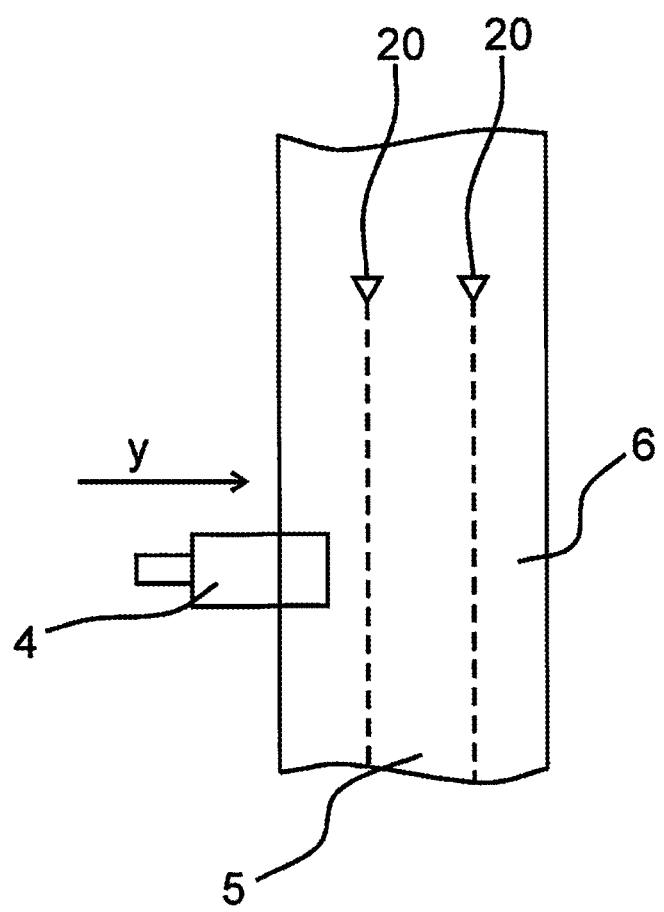
Figure 4:
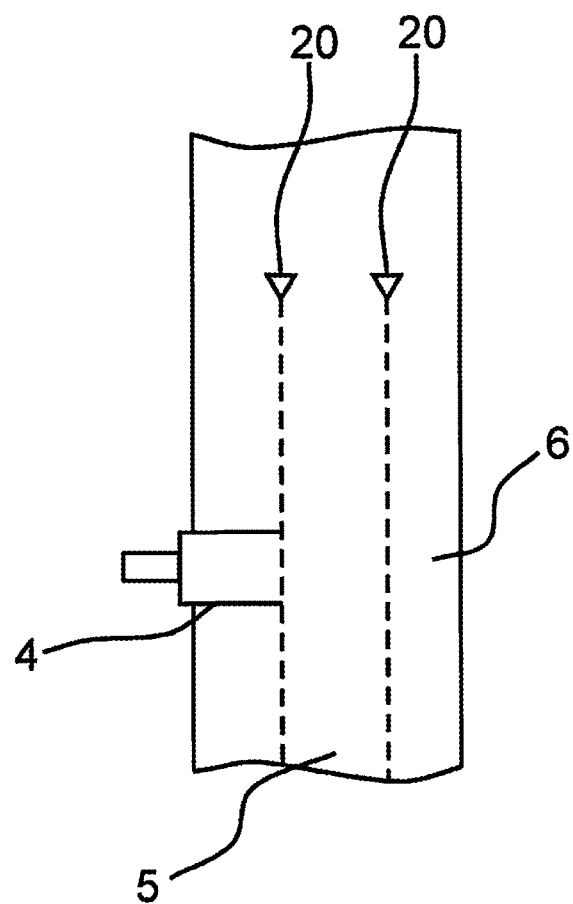

FIG. 3 now indicates that the pressing element can also be moved in direction y, i.e., orthogonal to directions x and z, while keeping the plies 5 and 6 spaced apart. The result is shown in FIG. 4. In this view, the pressing element is under the ply 5 but above the ply 6.

Figure 5:
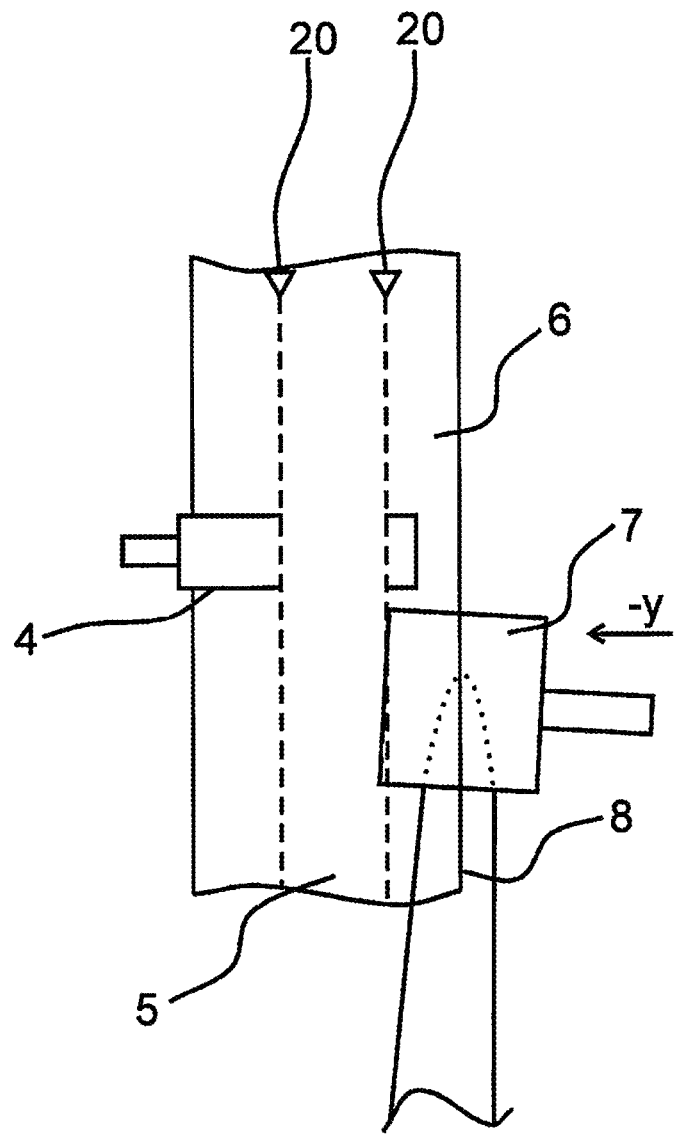
FIG. 5 the situation according to FIG. 4 with an additionally depicted holding element
  FIG. 6 the two-ply film web, now additionally with a joining device and a parting device.
Figure 6:
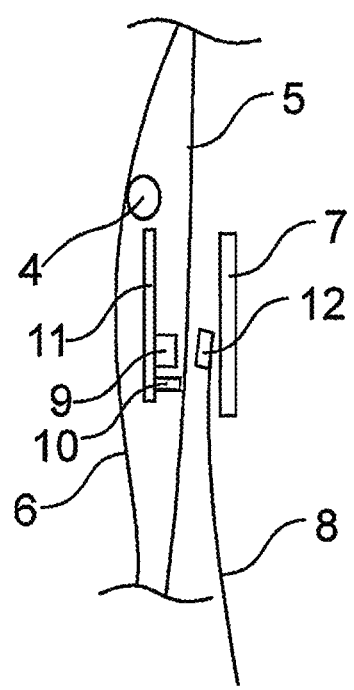

In FIG. 5, a holding device 7 can now be seen, on which a lead-in tape 8 is held on the side facing the film web. The holding device can now be moved in direction-y, so that the lead-in web is above the first ply 5. This can be seen in FIG. 6. FIG. 6 also shows a joining unit 9 and a parting unit 10. These can be disposed together on a carrier 11, which can be positioned between the two plies 5 and 6. The joining unit can now be used to press and join the ply 5 to the lead-in tape 8. The lead-in tape can already be provided with a double-sided adhesive tape 12, for example. The parting unit 10 can now separate the ply 5 below the joining location, which can in particular take place at the same time as the ply 5 is pressed onto the lead-in tape 8. The second winding point can now be started, so that the lead-in tape pulls the ply 5 toward this winding point, so that the first ply can be wound up there; this is not shown, however.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

LIST OF REFERENCE SIGNS

1 Two-ply film web
2 Lengthwise slit
3 Side edge
4 Pressing element
5 First ply
6 Second ply
7 Holding device
8 Lead-in tape
9 Joining unit
10 Parting unit 11 Carrier
12 Double-sided adhesive tape

What is claimed is:

1. An apparatus for separating a wound-up two-ply film web having a first ply and a second ply, the first and second plies of the two-ply film web being joined to one another via a first side edge and a second side edge, said apparatus comprising:
   at least two lengthwise slitting units configured to each make a lengthwise slit into only the first ply of the two plies of the two-ply film web, each of the two lengthwise slits being located at a distance inwardly from a respective one of the first side edge and the second side edge of the web, so as to provide in the first ply a narrow slit section defined by the two lengthwise slits, and
   at least one pressing element configured to move in a direction orthogonal to that of a plane defined by the two-ply film web so as to space apart from one another the two plies of the two-ply film web,
   the at least one pressing element being in contact only with a region of the two-ply film web that lies between one of the first and second side edges and a next adjacent lengthwise slit, and
   being movable in the plane of the two-ply film web, and perpendicular to a longitudinal direction thereof, so that the pressing element is inserted between the narrow slit section and the second ply.

2. The apparatus according to claim 1, further comprising a parting device configured to separate the first ply of the two-ply film web, so that a new start of the web is created.

3. The apparatus according to claim 2, further comprising a holding device configured to hold, and bring close to the first ply, a lead-in tape.

4. The apparatus according to claim 3, further comprising a joining device configured to join to one another the new start of the web and the lead-in tape.

5. A method of separating a wound-up two-ply film web having a first ply and a second ply, the two plies of the two-ply film web being joined to one another via a first side edge and a second side edge, said method comprising:
   introducing two lengthwise slits into only the first ply of the two plies of the two-ply film web with at least two lengthwise slitting units, each of the two lengthwise slits being located at a distance inwardly from a respective one of the first side edge and the second side edge of the web, so as to provide in the first ply a narrow slit section defined by the two lengthwise slits;
   separating the two plies of the two-ply film web from one another with at least one pressing element, the at least one pressing element being moved in a direction orthogonal to that of a plane defined by the two-ply film web; and
   inserting the pressing element between the narrow slit section and the second ply, the pressing element being moved in the plane of the two-ply film web and perpendicular to the longitudinal direction thereof.

6. The method according to claim 5, further comprising separating with a parting device the first ply of the two-ply film web, so that a new start of the web is created.

7. The method according to claim 6, further comprising holding with a holding device, and bringing close to the first ply, a lead-in tape.

8. The method according to claim 7, further comprising joining to one another with a joining device the new start of the web and the lead-in tape.

9. An apparatus for separating a wound-up two-ply film web having a first ply and a second ply, the first and second plies of the two-ply film web being joined to one another via a first side edge and a second side edge, said apparatus comprising:
   at least two lengthwise slitting units configured to each make a lengthwise slit into only the first ply of the two plies of the two-ply film web, each of the two lengthwise slits being located at a distance inwardly from a respective one of the first side edge and the second side edge of the web, so as to provide (i) in the first ply a narrow slit section defined by the two lengthwise slits and (ii) another section that includes the second ply and portions of the first ply outwardly of the two lengthwise slits, and
   at least one pressing element configured to move in a direction orthogonal to that of a plane defined by the two-ply film web so as to space apart from one another the two plies of the two-ply film web,
   the at least one pressing element being in contact only with a region of the two-ply film web that lies between one of the first and second side edges and a next adjacent lengthwise slit, and
   being movable in the plane of the two-ply film web, and perpendicular to a longitudinal direction thereof, so that the pressing element is inserted between the narrow slit section of the first ply and the section that includes the second ply and portions of the first ply outwardly of the two lengthwise slits.

* * * * *